US012786364B2

(12) United States Patent
Chen et al.

(10) Patent No.: US 12,786,364 B2
(45) Date of Patent: Nov. 3, 2026

(54) PROJECTION DEVICE AND PROJECTION METHOD THEREOF

(71) Applicant: Coretronic Corporation, Hsin-Chu (TW)

(72) Inventors: Kun-Hong Chen, Hsin-Chu (TW); Yi-Jun Liao, Hsin-Chu (TW); Yu-Hsuan Hsieh, Hsin-Chu (TW); Yun-Shih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 19 days.

(21) Appl. No.: 18/940,876

(22) Filed: Nov. 8, 2024

(65) Prior Publication Data

US 2025/0159120 A1 May 15, 2025

(30) Foreign Application Priority Data

Nov. 10, 2023 (CN) ......................... 202311495833.5

(51) Int. Cl.
*H04N 9/31* (2006.01)
*G01S 7/481* (2006.01)
*G01S 17/08* (2006.01)

(52) U.S. Cl.
CPC ......... *H04N 9/3194* (2013.01); *G01S 7/4816* (2013.01); *G01S 17/08* (2013.01); *H04N 9/317* (2013.01); *H04N 9/3185* (2013.01)

(58) Field of Classification Search
CPC .... H04N 9/3194; H04N 9/317; H04N 9/3185; G03B 21/53; G03B 21/147; G01S 7/4816; G01S 17/08
See application file for complete search history.

(56) References Cited

U.S. PATENT DOCUMENTS 11,622,832 B2 4/2023 Vayser et al.
12,501,005 B2 * 12/2025 Liao ......................... H04N 9/31
(Continued)

FOREIGN PATENT DOCUMENTS

CN 114624850 6/2022
CN 114885138 8/2022
(Continued)

OTHER PUBLICATIONS

"Office Action of Taiwan Related Application, Application No. 112143423",, issued on Jan. 7, 2025, p. 1-p. 5.
(Continued)

*Primary Examiner* — Brian P Yenke
*Assistant Examiner* — Humam M Satti
(74) *Attorney, Agent, or Firm* — JCIPRNET

(57) ABSTRACT

A projection device and a projection method thereof are provided. The projection device includes an optical engine, a ranging unit, and a processor. The optical engine projects an image beam to a target area to form a first image. The ranging unit emits testing light beams, detects reflected light beams reflected from the testing light beams, and obtains effective sensing information from the reflected light beams. The processor is coupled to the ranging unit and the optical engine, receives the effective sensing information from the ranging unit, and generates first projection distance information according to the effective sensing information. The processor controls the optical engine so that the first image corresponding to the image beam is located within an effective focal length range of the projection device.

22 Claims, 12 Drawing Sheets

(56) References Cited

U.S. PATENT DOCUMENTS

| | | | | |
|---|---|---|---|---|
| 2005/0046804 | A1* | 3/2005 | Akutsu | H04N 9/3194 353/70 |
| 2006/0197921 | A1* | 9/2006 | Kurosu | G03B 21/147 353/70 |
| 2008/0110265 | A1* | 5/2008 | Wong | H04N 9/3194 73/627 |
| 2017/0363942 | A1 | 12/2017 | Hiramatsu et al. | |
| 2021/0165308 | A1 | 6/2021 | Matsuyama | |
| 2021/0377501 | A1 | 12/2021 | Tu et al. | |
| 2022/0214553 | A1 | 7/2022 | Guo et al. | |
| 2026/0023166 | A1* | 1/2026 | Nishimoto | G01S 7/4863 |

FOREIGN PATENT DOCUMENTS

| | | |
|---|---|---|
| CN | 115174877 | 10/2022 |
| CN | 115273711 | 11/2022 |
| CN | 115278185 | 11/2022 |
| CN | 115883799 | 3/2023 |
| JP | 5029216 | 9/2012 |
| TW | 202145778 | 12/2021 |

OTHER PUBLICATIONS

Yi-Jun Liao et al., “The Projection Device and Projection Method”, Unpublished U.S. Appl. No. 18/940,671, filed Nov. 7, 2024.

Notice of Allowance of related U.S. Appl. No. 18/940,671, issued on Oct. 21, 2025, p. 1-p. 8.

* cited by examiner

PROJECTION DEVICE AND PROJECTION METHOD THEREOF

CROSS-REFERENCE TO RELATED APPLICATION

This application claims the priority benefit of China application serial no. 202311495833.5, filed on Nov. 10, 2023. The entirety of the above-mentioned patent application is hereby incorporated by reference herein and made a part of this specification.

BACKGROUND

Technical Field

The disclosure relates to a device and a method, and in particular to a projection device and a projection method thereof.

Description of Related Art

When projecting, the projection device can often automatically focus according to the sensing results of the ranging unit. However, the sensing results of the ranging unit may be abnormal under different usage conditions. For example, the interference of an obstacle in front of the projection screen may lead to abnormal sensing result, or the material properties of the projection screen may cause the testing light beams of the ranging unit to penetrates the projection screen to the wall surface behind and also lead to abnormal sensing results. The abnormal sensing results further leads to keystone correction failure or the projection device focusing on a wrong plane, which seriously affects the user experience of using the projection device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection device and a projection method thereof, which address the inaccuracy problem caused by the interference of obstacles when projection device is focusing, so that image correction can be performed by using correct sensing results.

In order to achieve one, part of, or all of the above purposes or other purposes, a projection device according to an embodiment of the disclosure is suitable for projecting to a target area. The projection device includes an optical engine, a ranging unit, and a processor. The optical engine is configured to project an image beam to form a first image. The ranging unit is configured to emit testing light beams to the target area and is configured to detect reflected light beams formed by reflection of the testing light beams and extract effective sensing information. The processor is coupled to the ranging unit and the optical engine. The processor is configured to receive the effective sensing information from the ranging unit and is configured to generate first projection distance information according to the effective sensing information, and the processor is configured to control the image beam projected by the optical engine to the target area according to the first projection distance information, so that the first image corresponding to the image beam is located within an effective focal length range of the projection device.

In order to achieve one, part of, or all of the above purposes or other purposes, a projection method according to an embodiment of the disclosure is suitable for controlling operations of a projection device. The projection device includes an optical engine, a ranging unit, and a processor. The projection method includes the following. Testing light beams are emitted to a target area by a ranging unit and reflected light beams formed by reflection of the testing light beams are detected to obtain effective sensing information, in which a part of the testing light beams penetrates the target area. The effective sensing information from the ranging unit is received by the processor and first projection distance information is generated according to the effective sensing information. An image beam projected by an optical engine to the target area is controlled according to the first projection distance information by the processor, so that a first image formed by the image beam is located within an effective focal length range of the projection device.

Based on the above, the projection device and the projection method according to the disclosure can properly eliminate reflection generated by obstacles to avoid interference when determining the distance and direction of the projection screen. In addition, the projection device according to the disclosure can eliminate the material factors of the projection screen, and the projection device can perform image correction by using correct sensing results.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising,"

or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
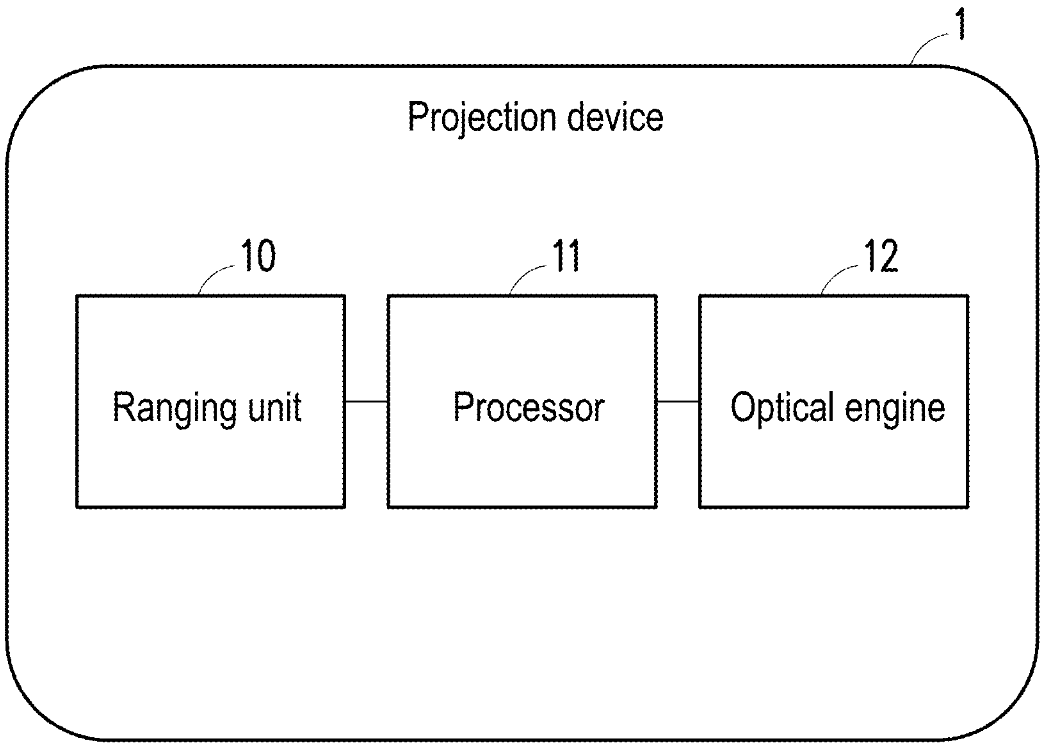
FIG. 1 is a block diagram of a projection device according to an embodiment of the disclosure.

FIG. 1 is a block diagram of a projection device 1 according to an embodiment of the disclosure. The projection device 1 includes a ranging unit 10, a processor 11, and an optical engine 12. In some embodiments, the projection device 1 is configured to project toward a target area. The target area is, for example, an area suitable for presenting an image, such as a projection screen, a wall, or a projection film on a plate. In the following embodiment, the projection screen is taken as an example of the target area for description. The optical engine 12 of the projection device 1 may be configured to project an image beam toward the projection screen for forming a first image corresponding to the image beam. In order to enable the optical engine 12 to display the first image on the projection screen with a good imaging quality, the projection device 1 uses the ranging unit 10 to measure the distance between the projection device 1 and the projection screen (the target area), and the processor 11 is coupled to the ranging unit 10. More specifically, the ranging unit 10 may be configured to emit testing light beams to the projection screen and detect reflected light beams formed by reflection of the testing light beams. The ranging unit 10 detects the reflected light beams to extract effective sensing information. Further, the processor 11 may be configured to receive the effective sensing information provided by the ranging unit 10 and generate first projection distance information according to the effective sensing information. Accordingly, the processor 11 may control the optical engine 12 to project the image beam to the position of the projection screen according to the first projection distance information, so that the first image corresponding to the image beam is formed within an effective focal length range of the projection device 1 (which means that the first image is presented as a clear image on the projection screen based on the correct distance information).

In some embodiments, the ranging unit 10 may be, for example, a 3D camera or a time of flight (ToF) sensor, which can capture image of the target area and obtain depth information of each object in the captured image. In some embodiments, the processor 11 may be, for example, a central processing unit (CPU), or other programmable general-purpose or special-purpose micro control units (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), any other kinds of integrated circuits, a state machine, a processor based on advanced RISC machine (ARM), or other similar components or a combination of the above components. In some embodiments, the optical engine 12 may have, for example, a light source, at least one light valve (for example, a digital micromirror device (DMD) or a liquid crystal on silicon (LCoS) panel), and other lens structures including one or more optical lens with diopter.

In detail, the ranging unit 10 can emit the testing light beams and detect the reflected light beams formed by the testing light beams when encountering a reflecting object. The testing light beams emitted by the ranging unit 10 may cover multiple different sensing points on the target area. The ranging unit 10 may generate distance or depth information corresponding to the distance between the ranging unit 10 and the reflecting object according to the time difference between emitting the testing light beams and receiving the reflected light beams, and obtain corresponding sensing information accordingly. Details of sensing information will be described below in FIG. 2.

Figure 2:
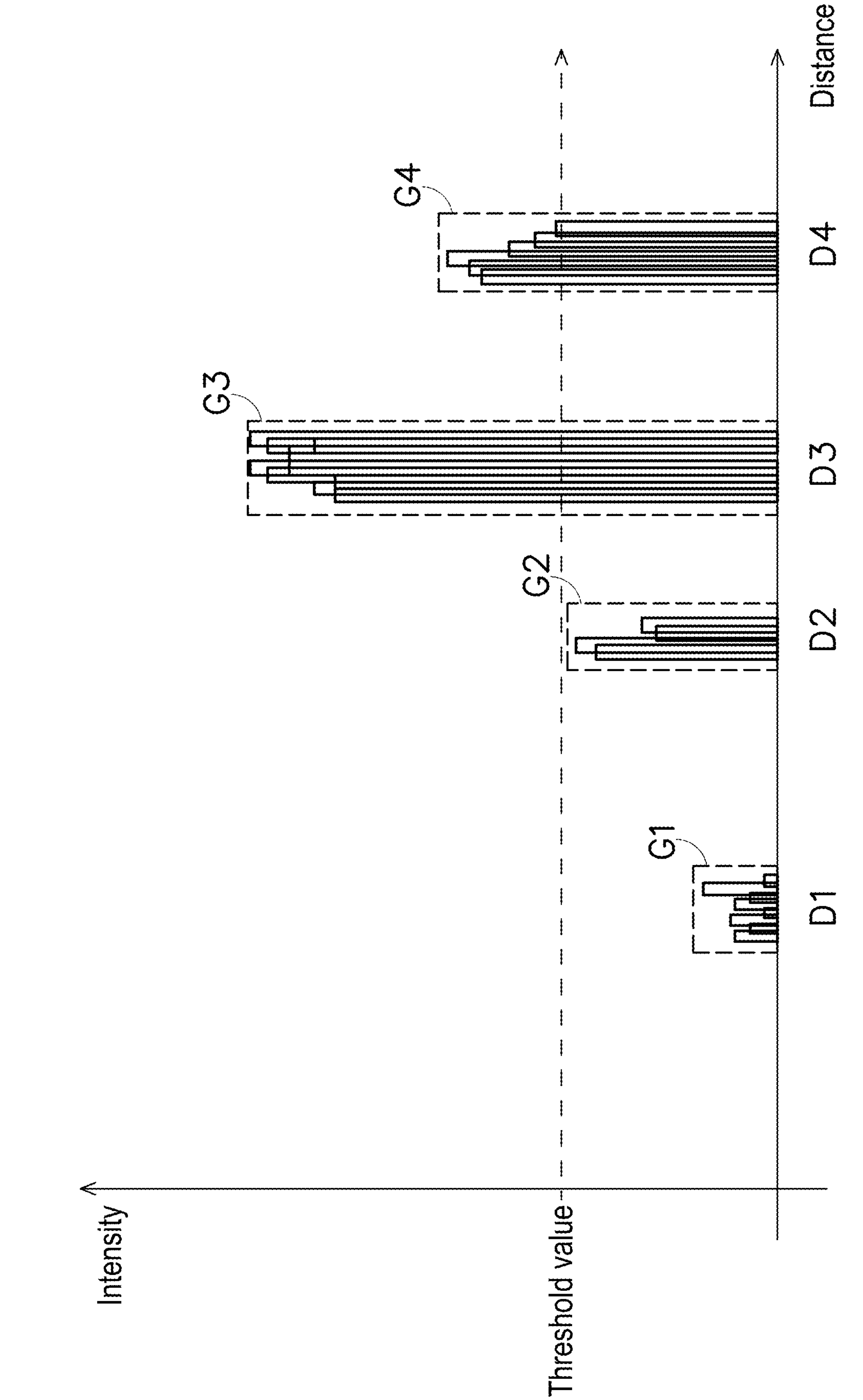
FIG. 2 is a schematic view of sensing information generated by a ranging unit and a processor according to an embodiment of the disclosure.

FIG. 2 is a schematic view of sensing information generated by the ranging unit 10 and the processor 11 according to an embodiment of the disclosure. In FIG. 2, the horizontal axis shows different distance ranges due to different sensing points covering the target area, and the different distance ranges correspond to the reflected light beams received by the ranging unit. The vertical axis shows the energy intensity of the reflected lights received by the ranging unit 10 under the corresponding distance. Specifically, the ranging unit 10 may include an array formed by multiple single photon avalanche diodes (SPAD). Further, the ranging unit 10 can detect the reflected light beam formed by the reflection of the testing light beam and obtain the effective sensing information. The effective sensing information are related to at least part of the reflected light beams corresponding to different distances. The at least part of the reflected light beams corresponding to different distances are divided into reflected light groups G1 to G4 by the processor 11. The reflected light groups G1 to G4 respectively correspond to distance ranges D1 to D4. Each distance range covers multiple similar distance values in the sensing information. To further explain, the detected reflected light beams in distance ranges D1 and D2 are, for example, low-energy noise interference; the distance range D3 is, for example, the distance range from the ranging unit 10 to the projection screen; the distance range D4 is, for example, the distance range from the ranging unit 10 to a wall behind the projection screen, and the energy intensity of the reflected light beams in distance range D4 is lower than the energy intensity of the reflected light beams in distance range D3 since the travel distance of the reflected light beams is longer.

In some embodiments, the ranging unit 10 may select the at least part of the reflected light beams from the reflected light beams according to the set condition. Specifically, the ranging unit 10 may select the at least part of the reflected light beam(s) having energy intensity greater than a threshold value from the reflected light beams in FIG. 2 as effective reflected light beam(s), thereby filtering out the noise interference. Also, an effective sensing point corresponding to the effective reflected light beam is selected as the effective sensing information and the effective sensing information is provided to the processor 11 for subsequent operations. The effective sensing point(s) will be further described below.

Figure 3A:
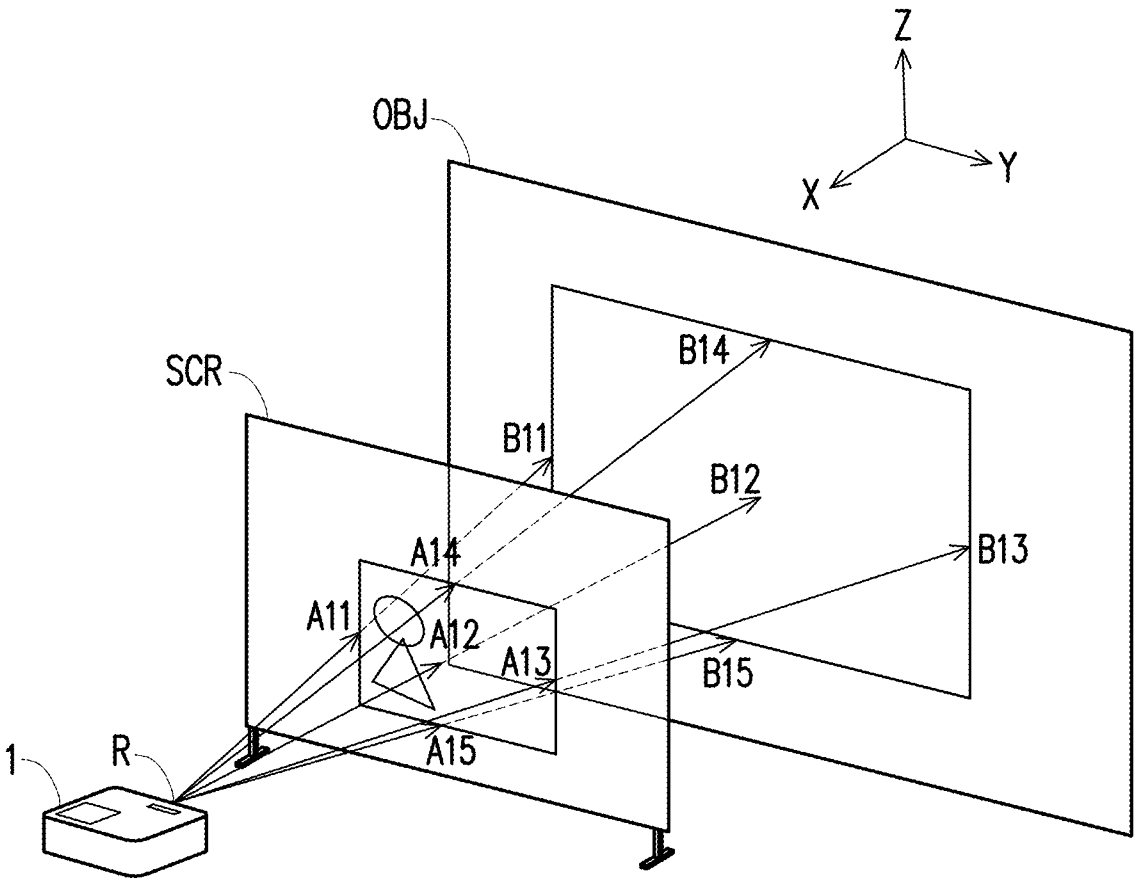
FIG. 3A is a perspective view of a projection device emitting testing light beams to a projection screen according to the disclosure.

FIG. 3A is a perspective view of the projection device 1 emitting the testing light beams to a projection screen SCR (the target area) according to the disclosure. FIG. 3A shows the projection device 1, the projection screen SCR, and an obstacle OBJ. In this embodiment, the projection screen SCR is used as a first reflective surface, the obstacle OBJ is used as a second reflective surface, and the first reflective surface is between the projection device and the second reflective surface. In other embodiments, the second reflective surface may be other objects with light reflection properties, and the second reflective surface may also be a plane or a curved surface. Please refer to FIG. 3A together with FIG. 1. The ranging unit 10 of the projection device 1 may be used to emit the testing light beams in the direction of the projection screen SCR, the testing light beams are projected to multiple different sensing points A11 to A15 on the projection screen SCR, and the reflected light beams reflected at the sensing points A11 to A15 are detected. In some embodiments, in addition to the testing light beams being projected onto the projection screen SCR, some of the testing light beams may partially penetrates the projection screen SCR and is projected onto the obstacle OBJ and reflected by the obstacle OBJ, so that the ranging unit 10 detects sensing points B11 to B15. The sensing points B11 to B15 on the obstacle OBJ positionally correspond to the sensing points A11 to A15 on the projection screen SCR. As a result, in addition to the reflected light beams reflected by the sensing points A11 to A15 on the projection screen SCR, the ranging unit 10 also detects the reflected light beams reflected by the sensing points B11 to B15 on the obstacle OBJ. Since the reflected light beams corresponding to the sensing points A11 to A15 and B11 to B15 meet the set condition, the sensing points A11 to A15 and B11 to B15 are selected as the effective sensing points, and thereby selected as the effective sensing information. The processor 11 controls the optical engine 12 to correctly present the first image on the projection screen SCR according to the effective sensing information provided by the ranging unit 10. The first image is, for example, the image comprising a circle and a triangle in FIG. 3A.

Please continue to refer to FIG. 3A together with FIG. 1. In the embodiment of FIG. 3A, during the process that the ranging unit 10 emits the testing light beams in the direction of the projection screen SCR and detects the reflected light beams, the five sensing points A11 to A15 may be obtained, and B11 to B15 are the other five sensing points obtained correspondingly when the testing light beams partially penetrating the projection screen SCR are reflected by the obstacle OBJ behind the projection screen SCR. The sensing points A11, A12, and A13 are arranged in a connecting line along a first direction (for example, a Y-axis direction), and the sensing point A12 corresponds to, for example, the center of the projection screen SCR. The sensing points A14 and A15 may be arranged in a connecting line along a second direction (for example, a Z-axis direction) with the sensing point A12 at the center. The sensing points B11, B12, and B13 correspond to the sensing points A11, A12, and A13 and are arranged in a connecting line along the first direction (for example, the Y-axis direction). The sensing points B14 and B15 may be arranged in a connecting line along the second direction (for example, the Z-axis direction) with the sensing point B12 at the center. When the ranging unit 10 determines that the reflected light beams reflected by the sensing points A11, A12, A13, B11, B12, and B13 meet the set condition, the reflected light beams that satisfy the set condition may be determined as first effective reflected light beams, and the corresponding sensing points A11, A12, A13, B11, B12, and B13 are determined as first effective sensing points. Similarly, the ranging unit may determine the reflected light beams corresponding to the sensing points A14, A15 and B14, B15 are effective reflected light beams if the set condition is satisfied. The effective reflected light beams arranged along the Z-axis direction are regarded as second effective reflected light beams, and corresponding second effective sensing points include A14, A12, A15 and B14, B12, B15. Finally, the ranging unit 10 may include sensing information related to the first effective sensing points and the second effective sensing points as the effective sensing information and transmit the effective sensing information to the processor 11.

Specifically, after receiving the effective sensing information provided by the ranging unit 10, the processor 11 may select at least three first effective sensing points that are arranged in a connecting line along the first direction on one plane as first selected sensing points (for example, in FIG. 3A, the processor 11 selects the selected sensing points as A11, A12, and A13) according to the first effective sensing points of the effective sensing information and generate first projection distance information according to the first selected sensing points. Similarly, the processor 11 may also select at least three second sensing points that are arranged in a connecting line along the second direction on the same plane as second selected sensing points (for example, in FIG. 3A, the processor 11 selects the selected sensing points as A14, A12, and A15), and generate second projection distance information according to the second selected sensing points.

In some embodiments, the processor 11 may adjust the condition for selecting the first selected sensing point according to different system settings or environmental conditions. In some cases, the processor 11 may select at least three points from the first effective sensing points that are arranged in a connecting line that is completely parallel to the first direction connecting line as the first selected sensing points, and an angle formed by the first effective sensing points connecting line also appears to be arranged in a straight line of 180°. However, in some other cases, as the projection screen or a projection imaging surface may have some non-idealities of bending or curvature (unevenness), the processor 11 may also adjust the condition for selecting the first selected sensing point to tolerate such non-ideality. For example, the first selected sensing points selected by the processor 11 are arranged in a connecting line that may not be completely parallel to the first direction and may have an angle variation of, for example, +5% from the first direction. In addition, as long as the angle formed by the connecting line of any three or more than three first selected sensing points falls in a range of 180°+5°, the first effective sensing points may also be regarded as arranged in a straight line, and the sensing points may be determined as the first selected sensing points. The method for determining the second selected sensing points is similar to determining the first selected sensing points, with the difference being the second selected sensing points are arranged along a different direction then the first direction, and is therefore omitted herein.

In some embodiments, the processor 11 selects the first selected sensing points closest to the projection device 1 (for example, the sensing points A11, A12, and A13 are selected) and generates the first projection distance information accordingly. In this embodiment, the first effective sensing points obtained by the processor 11 comprise the three first effective sensing points A11, A12, and A13 or comprise the three first effective sensing points B11, B12, and B13. The processor 11 selects the first effective sensing points A11, A12, and A13 closer to the projection device 1 as the first selected sensing points, and generates the first projection distance information accordingly. Therefore, the interference of the obstacle OBJ behind the projection screen SCR is eliminated for the ranging unit 10. As a result, the first image projected to the projection screen SCR is formed within an effective focal length range of the projection device 1.

Similar to the process of the processor 11 determining the first projection distance information, the processor 11 may also obtain the second effective sensing points from the effective sensing information and determine whether the second effective sensing points comprise the three second effective sensing points A14, A12, A15, or comprise the three second effective sensing points B14, B12, B15, The processor 11 selects the second effective sensing points A14, A12, and A15 that is the closest to the projection device 1 as the second selected sensing points, and generates the second projection distance information according to the selected second selected sensing points. The first projection distance information and the second projection distance information include the distance information of the projection screen SCR in the first and second directions, and the first direction and the second direction may be different directions, for example, on a YZ plane. In this embodiment, the first direction may be the Y-axis direction, the second direction may be the Z-axis direction, and the first direction is substantially perpendicular to the second direction. In this case, the processor 11 may obtain projection surface distance information of the projection screen SCR in the first direction and the second direction according to the first projection distance information and the second projection distance information, so as to control the optical engine 12 to adjust the effective focal length range onto the projection screen SCR accordingly.

To explain in detail, in an embodiment presented in FIG. 3A, the processor 11 may determine whether the first effective sensing points A11 to A13 are arranged along the first direction in a straight line according to an included angle ∠ A11RA12, an included angle 2 A12RA13, and the distance information of the first effective sensing points A11 A13. The included angle ∠ A11RA12 is formed by the effective sensing point A11, a point R, and the effective sensing point A12. The included angle ∠ A12RA13 is formed by the effective sensing point A12, the point R, and the effective sensing point A13. The point R is a reference point of the system. For example, point R may be defined according to the known position of the light exiting port of the testing light beams.

Furthermore, the processor 11 may also generate the first projection distance information in the first direction and the second projection distance information in the second direction of the projection screen SCR according to the effective sensing information to perform a keystone correction. Specifically, there may be a projection image distortion caused by projection angle offset between the projection device 1 and the projection screen SCR, and the processor 11 can perform the keystone correction according to the distance information corresponding to the obtained first effective sensing points A11, A12, A13 and the second effective sensing points A14, A12, A15 to adjust the area of the first image projected by the optical engine 12, thereby eliminating the image distortion caused by the projection angle.

To explain in detail, the processor 11 may determine a plane direction of the projection screen SCR according to the selected first selected sensing points and the second selected sensing points. Specifically, the processor 11 may obtain the first projection angle information (the included angle ∠ A11RA13) of the projection screen SCR in the first direction according to the first distance information generated according to the selected first selected sensing points A11, A12, and A13, and obtain the second projection angle information (the included angle ∠ A14RA15) of the projection screen SCR in the second direction according to the second distance information generated according to the selected second selected sensing points A14, A12, and A15. Furthermore, the processor 11 may combine the first projection angle information and the second projection angle information to obtain projection plane angle information of the entire the projection screen SCR. As a result, the processor 11 may determine the plane direction of the projection screen SCR, and adjust the area of the first image projected by the optical engine 12 according to the projection plane angle information, thereby eliminating the image distortion caused by the projection angle.

In some embodiments, other than the obstacle OBJ behind the projection screen SCR, there may also be sporadic obstacles disposed on the front side of the projection screen SCR interfering with the ranging unit 10 to perform ranging operations on the projection screen SCR. In this case, the processor 11 may also perform a determination process according to whether the energy intensity differences of the first effective reflected light beams falls within a predetermined range. For example, when there are multiple obstacles between the projection screen SCR and the projection device 1 and the reflected light beams reflected by the multiple obstacles meet the set condition, the processor 11 may determine whether the energy intensity of the reflected light beams is uniform. When the processor 11 determines that the energy difference of any one of the reflected light beams exceeds the predetermined range, the processor 11 may eliminate the effective sensing points corresponding to the reflected light beams from the selected sensing points. The effective sensing points that correspond to reflected light beams with reflected energy difference within the predetermined range is selected as selected sensing points to generate the first projection distance information. As a result, when the ranging unit 10 performs ranging operations on the projection screen SCR, the projection device 11 can effectively eliminate the interference generated by the obstacles arranged in a straight line in front of the projection screen SCR under certain unexpected circumstances. The predetermined range may be, for example, the reflected energy difference being within ±5% or ±10%.

Figure 3B:
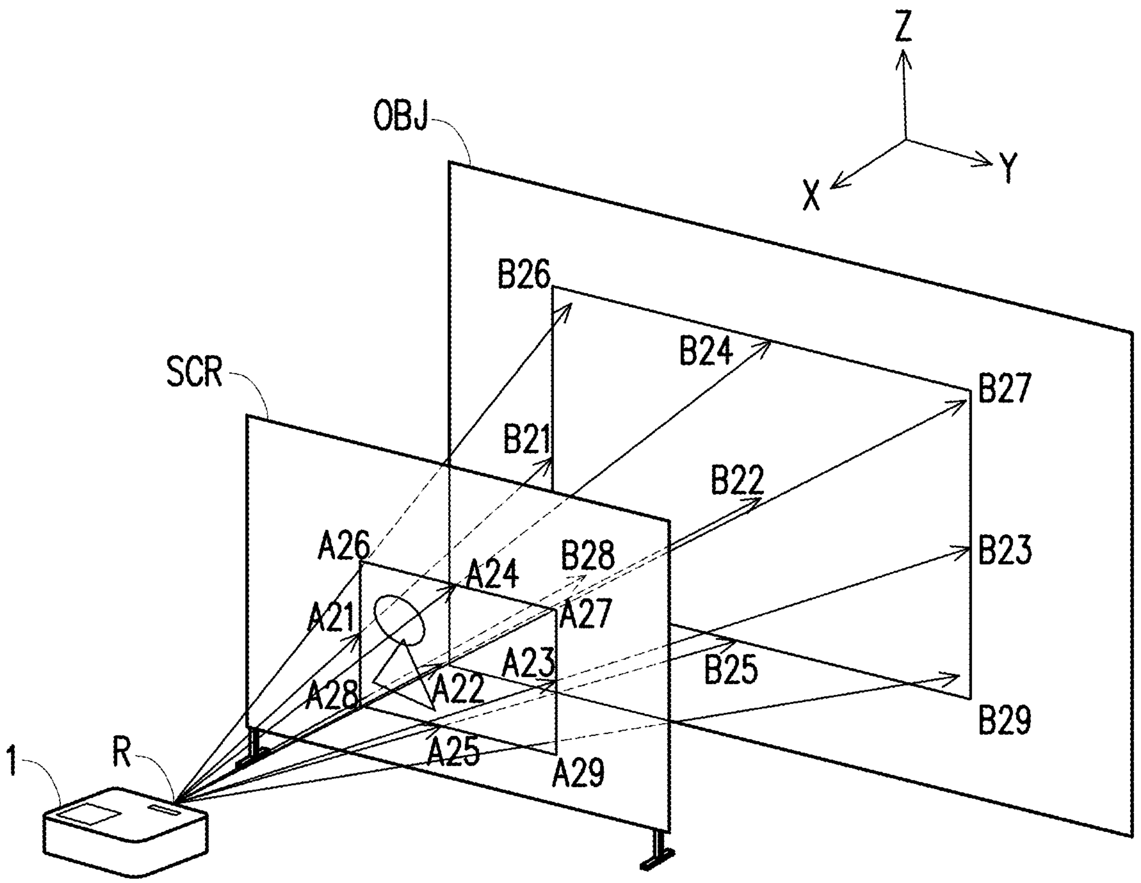
FIG. 3B is a perspective view of a projection device emitting testing light beams to a projection screen according to the disclosure.

FIG. 3B is a perspective view of the projection device 1 emitting testing light beams to the projection screen SCR according to the disclosure. FIG. 3B is similar to FIG. 3A, while sensing points corresponding to the four corners of the projection screen SCR are added in FIG. 3B. In FIG. 3B, there are nine sensing points on the projection screen SCR, and there are also nine sensing points on the obstacle OBJ correspondingly, which may be regarded as three groups of effective sensing points arranged along the first direction and each forming a connecting line and three groups of effective sensing points arranged along the second direction and each forming a connecting line.

Please continue to refer to FIG. 3B with FIG. 1. In the embodiment of FIG. 3B, during the process that the ranging unit 10 emits the testing light beams to the projection screen SCR and detects the reflected light beams, reflected light beams corresponding to sensing points A21 to A29 from the projection screen SCR and reflected light beams corresponding to sensing points B21 to B29 from the obstacle OBJ may be obtained and are determined as effective sensing points by the ranging unit 10. Accordingly, effective sensing information related to the effective sensing points A21 to A29 and B21 to B29 is generated and provided to the processor 11. The processor 11 may generate the first and second projection distance information according to the effective sensing information to control the optical engine 12 to correctly present the first image on the projection screen SCR. In addition, the processor 11 may also generate the projection plane angle information according to the first and second projection distance information to control the optical engine 12 to perform an accurate keystone correction. The above-mentioned content on how the processor 11 adjusts the focal length of the optical engine 12 and performs the keystone correction according to effective sensing information has been described in detail in the above paragraph describing FIG. 3A, and is therefore omitted herein.

In some embodiments, the processor 11 may first determine whether the first effective sensing points A21-A23 and B21-B23 are effective sensing points arranged along the first direction and forming a connecting line. However, in some situations, when there is an obstacle disposed between the projection device 1 and the projection screen SCR, a part of the testing light beams emitted to the projection screen SCR are blocked, which prevents the processor 11 from determining that there are the first selected sensing points arranged along the first direction and forming a connecting line among the first effective sensing points A21-A23 and B21-B23, the processor 11 may also select other groups of effective sensing points from other testing light beams to determine the first projection distance information. For example, the processor 11 may select first effective sensing points A26, A24, and A27 for analysis, or, the processor 11 may select first effective sensing points B26, B24, and B27 for analysis. As a result, the processor 11 may generate first projection distance information according to the other groups of first effective sensing points.

Please continue to refer to FIG. 3B with FIG. 1. In some embodiments, among the testing light beams emitted by the ranging unit 10, testing light beams emitted to the corners of the projection screen SCR may be used to obtain third sensing points located at the corners of the projection screen SCR, and the third effective sensing points are selected to assist in generating third projection distance information. In this case, performing ranging on the four corners of the projection screen SCR can enhance the rigor of determining the effective sensing information.

Figure 4A:
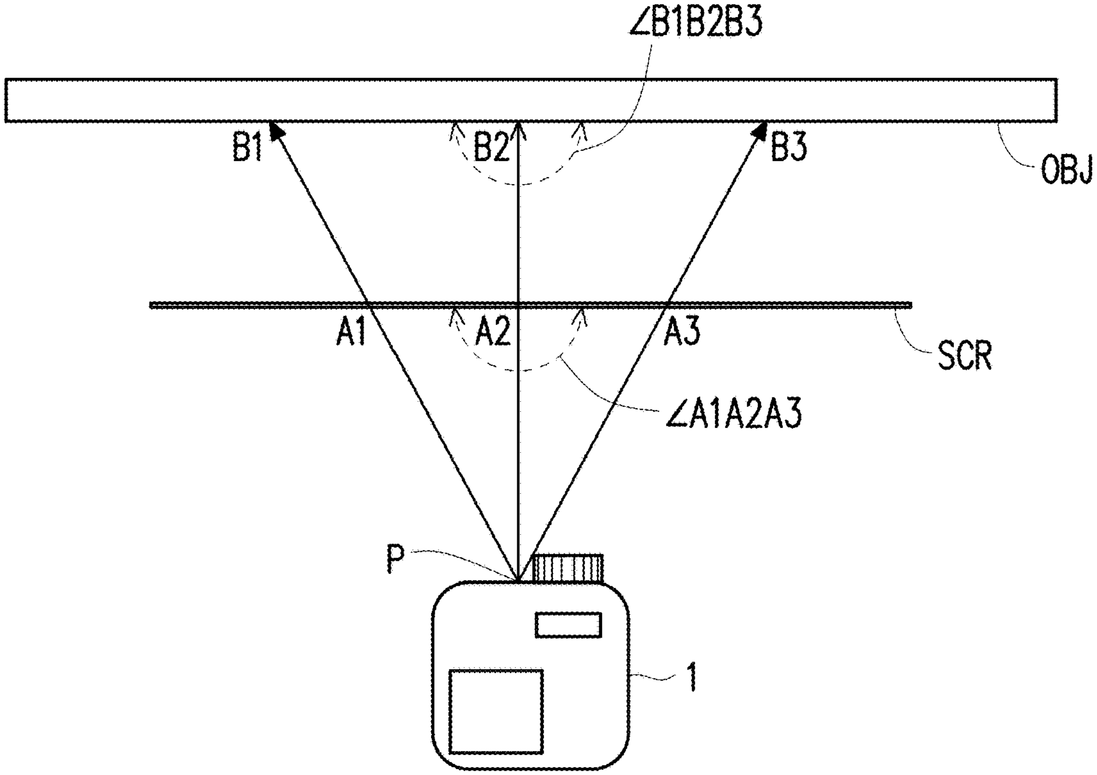
FIG. 4A to FIG. 4K are schematic views illustrating the projection device performing ranging in different situations according to embodiments of the disclosure.

FIG. 4A to FIG. 4K are schematic views illustrating the projection device 1 performing ranging in different situations according to embodiments of the disclosure, in which the ranging units 10 represent the ranging unit 10 in FIG. 1, and detail description is omitted herein. In FIG. 4A, the ranging unit 10 receives the reflected light beams corresponding to the sensing points A1-A3 on the projection screen SCR and the reflected light beams corresponding to the sensing points B1-B3 on the obstacle OBJ. The sensing points A1-A3 and B1-B3 are determined as the first effective sensing points by the ranging unit 10. The sensing points A1 to A3 on the projection screen SCR may replace the sensing points A11-A13 in FIG. 3A or the sensing points A21 to A23 in FIG. 3B, and the sensing points B1-B3 corresponding to the obstacle may replace the sensing points B11-B13 in FIG. 3A or the sensing points B21-B23 in FIG. 3B. In this situation, the included angle ∠ A1A2A3 of the first effective sensing points A1 to A3 and the included angle ∠ B1B2B3 of the first effective sensing points B1 to B3 are approximately 180° or fall in a range of 180°±5°. Therefore, the processor 11 may use the included angle ∠ A1PA2, the included angle ∠ A2PA3, the included angle ∠ B1PB2, and the included angle ∠ B2PB3 to determine an angle formed by the connecting line connecting two groups of first effective sensing points, which is first group of effective sensing points A1, A2 and A3 and the second group of first effective sensing points B1, B2, and B3. The included angle ∠ A1PA2 is formed by the effective sensing point A1, a point P, and the effective sensing point A2. The included angle ∠ A2PA3 is formed by the effective sensing point A2, point P, and the effective sensing point A3. The included angle ∠ B1PB2 is formed by the effective sensing point B1, point P, and the effective sensing point B2. The included angle ∠ B2PB3 is formed by the effective sensing point B2, point P, and the effective sensing point B3. Point P is a reference point of the system herein. Among the angles formed by the connecting line connecting two groups of first effective sensing points, the processor 11 may select a group closer to the projection device 1 as the first selected sensing points to generate the first projection distance information.

Figure 4B:
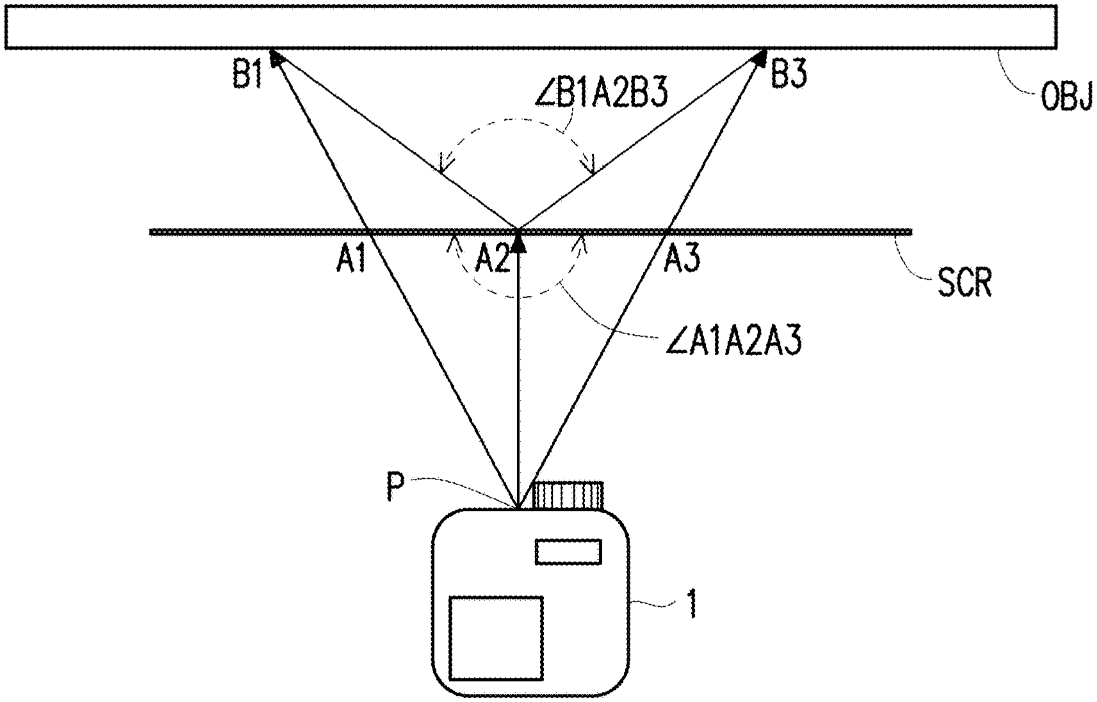

In FIG. 4B, the ranging unit 10 obtains the reflected light beams corresponding to the first effective sensing points A1-A3 on the projection screen SCR, but only obtains the reflected light beams corresponding to the first effective sensing points B1 and B3 on the obstacle OBJ. That is, the testing light emitted toward the sensing point A2 does not penetrate the projection screen SCR nor is it reflected by the obstacle OBJ. As a result, when the processor 11 determines whether there are the first selected sensing points arranged along the first direction and forming a connecting line, the processor 11 determines that the included angle ∠ A1A2A3 is approximately 180° or falls in a range of 180°±5°, but not the included angle ∠ B1A2B3. Therefore, the processor 11 selects the sensing points A1, A2, and A3 as the first selected sensing points, and generates the first projection distance information according to the first selected sensing points.

Figure 4C:
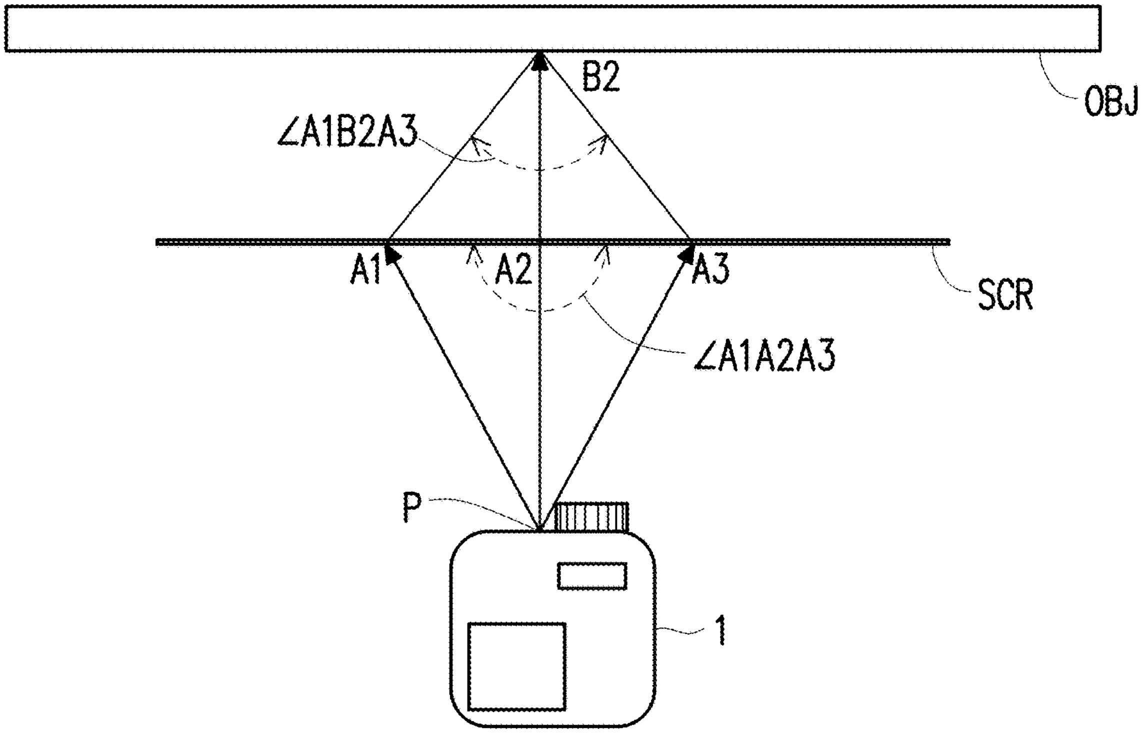

In FIG. 4C, the testing light beams emitted by the ranging unit 10 do not penetrate the projection screen SCR at the positions corresponding to the first effective sensing points A1 and A3, so reflected light beams from the obstacle OBJ corresponding to the sensing points A1 and A3 cannot be obtained. As a result, when the processor 11 determines whether there are the first selected sensing points arranged along the first direction and forming a connecting line, the processor 11 determines that the included angle ∠ A1A2A3 is approximately 180° or falls in a range of 180°±5°, but not the included angle ∠ A1B2A3. Therefore, the processor 11 selects the sensing points A1, A2, and A3 as the first selected sensing points, and generates the first projection distance information according to the first selected sensing points.

Figure 4D:
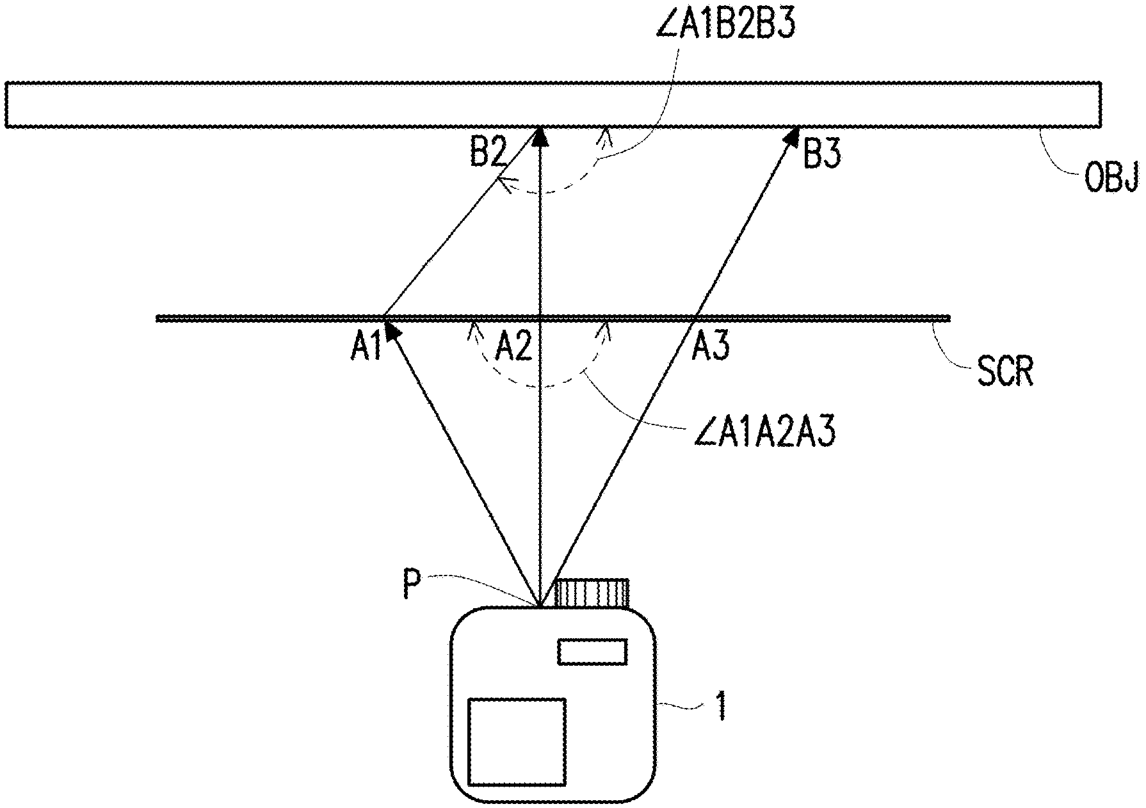

In FIG. 4D, the testing light beams emitted by the ranging unit 10 does not penetrates the projection screen SCR at the position corresponding to the first effective sensing point A1, so the reflected light beam of the sensing point on the obstacle OBJ corresponding to the sensing point A1 cannot be obtained. As a result, when the processor 11 determines whether there are the first selected sensing points arranged along the first direction and forming a connecting line, the processor 11 determines that the included angle ∠ A1A2A3 is approximately 180° or falls in a range of 180°±5°, but not the included angle ∠ A1B2B3. Therefore, the processor 11 selects the sensing points A1, A2, and A3 as the first selected sensing points, and generates the first projection distance information according to the first selected sensing points.

Figure 4E:
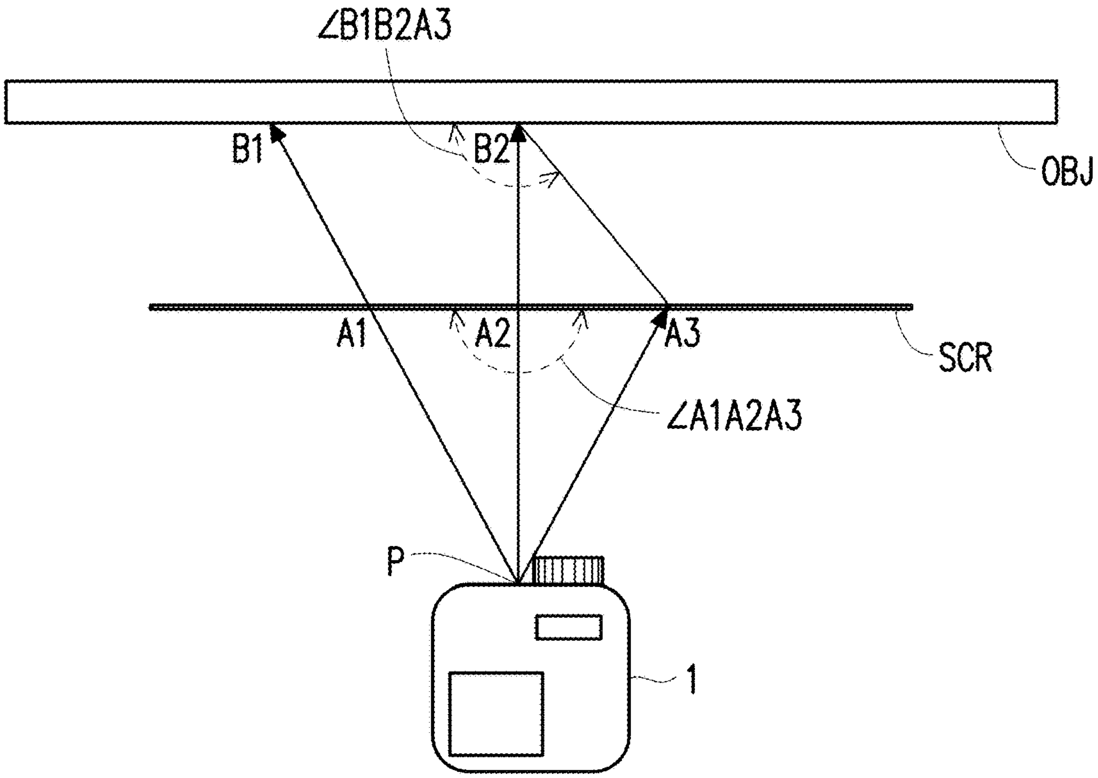

In FIG. 4E, the first testing light beam emitted by the ranging unit 10 does not penetrate the projection screen SCR at the position corresponding to the first effective sensing point A3, so the reflected light beam of the sensing point on the obstacle OBJ corresponding to the sensing point A3 cannot be obtained. As a result, when the processor 11 determines whether there are the first selected sensing points arranged along the first direction and forming a connecting line, the processor 11 determines that the included angle ∠ A1A2A3 is approximately 180° or falls in a range of 180°±5°, but not the included angle ∠ B1B2A3. Therefore, the processor 11 selects the sensing points A1, A2, and A3 as the first selected sensing points, and generates the first projection distance information according to the first selected sensing points.

Figure 4F:
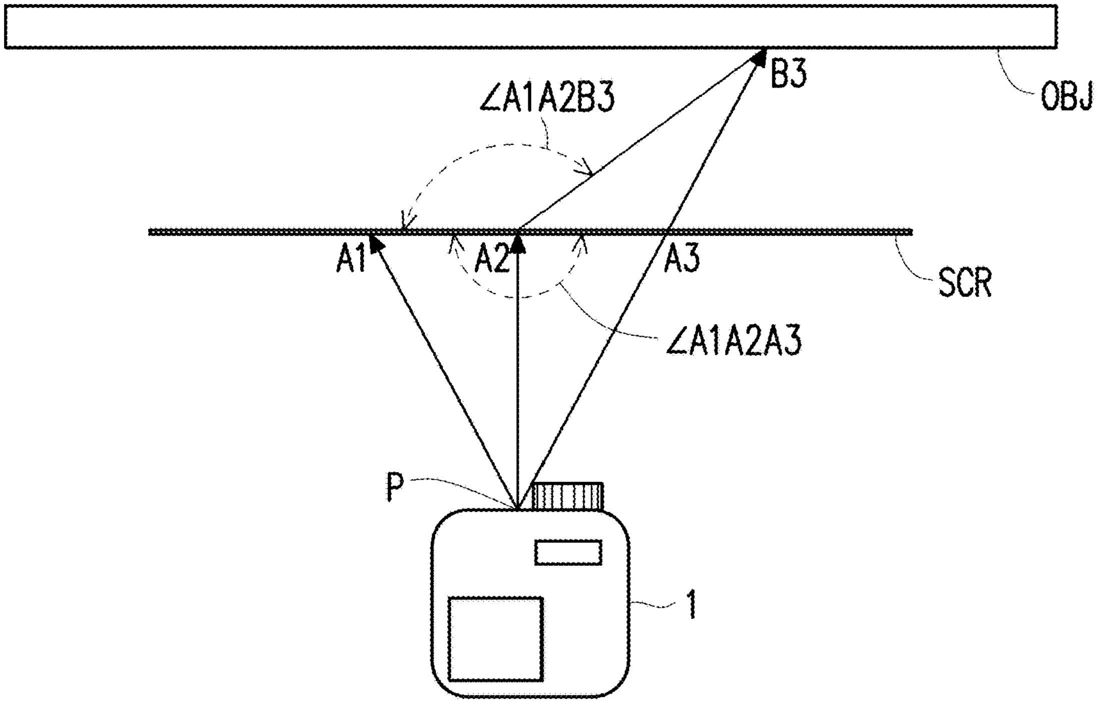

In FIG. 4F, the first testing light beams emitted by the ranging unit 10 do not penetrates the projection screen SCR at the positions corresponding to the first effective sensing points A1, A2, so the reflected light beams of the sensing points on the obstacle OBJ corresponding to the sensing points A1, A2 cannot be obtained. Only the testing light beam emitted toward the first effective sensing point A3 penetrates the projection screen SCR, and the reflected light beam of the sensing point B3 on the obstacle OBJ corresponding to the first effective sensing point A3 is obtained. As a result, when the processor 11 determines whether there are the first selected sensing points arranged along the first direction and forming a connecting line, the processor 11 determines that the included angle ∠ A1A2A3 is approximately 180° or falls in a range of 180°±5°, but not the included angle ∠ A1A2B3. Therefore, the processor 11 selects the sensing points A1, A2, and A3 as the first selected sensing points, and generates the first projection distance information according to the first selected sensing points.

Figure 4G:
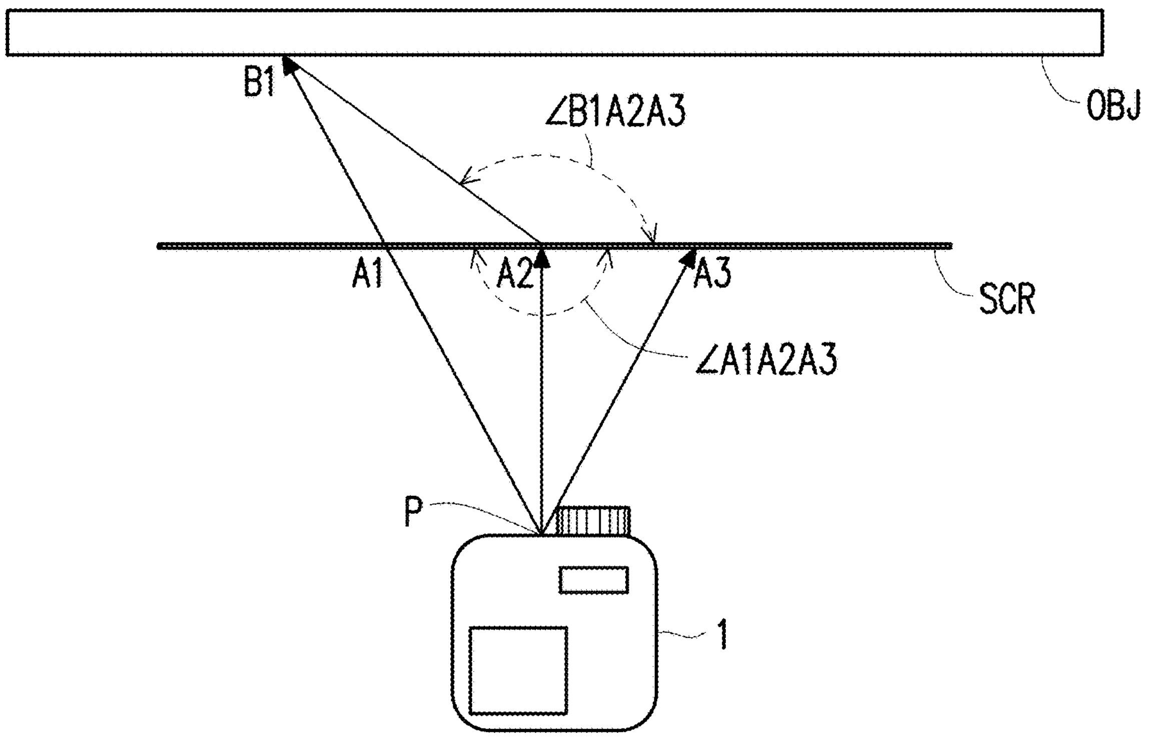

In FIG. 4G, the first testing light beams emitted by the ranging unit 10 do not penetrate the projection screen SCR at the positions corresponding to the first effective sensing points A2, A3, so the reflected light beams of the sensing points on the obstacle OBJ corresponding to the sensing points A2, A3 cannot be obtained. Only the testing light beams emitted toward the position corresponding to the first effective sensing point A1 penetrates the projection screen SCR, and the reflected light beam of the sensing point B1 on the obstacle OBJ is obtained. As a result, when the processor 11 determines whether there are the first selected sensing points arranged along the first direction and forming a connecting line, the processor 11 determines that the included angle ∠ A1A2A3 is approximately 180° or falls in a range of 180°±5°, but not the included angle ∠ B1A2A3. Therefore, the processor 11 selects the sensing points A1, A2, and A3 as the first selected sensing points, and generates the first projection distance information according to the first selected sensing points.

Figure 4H:
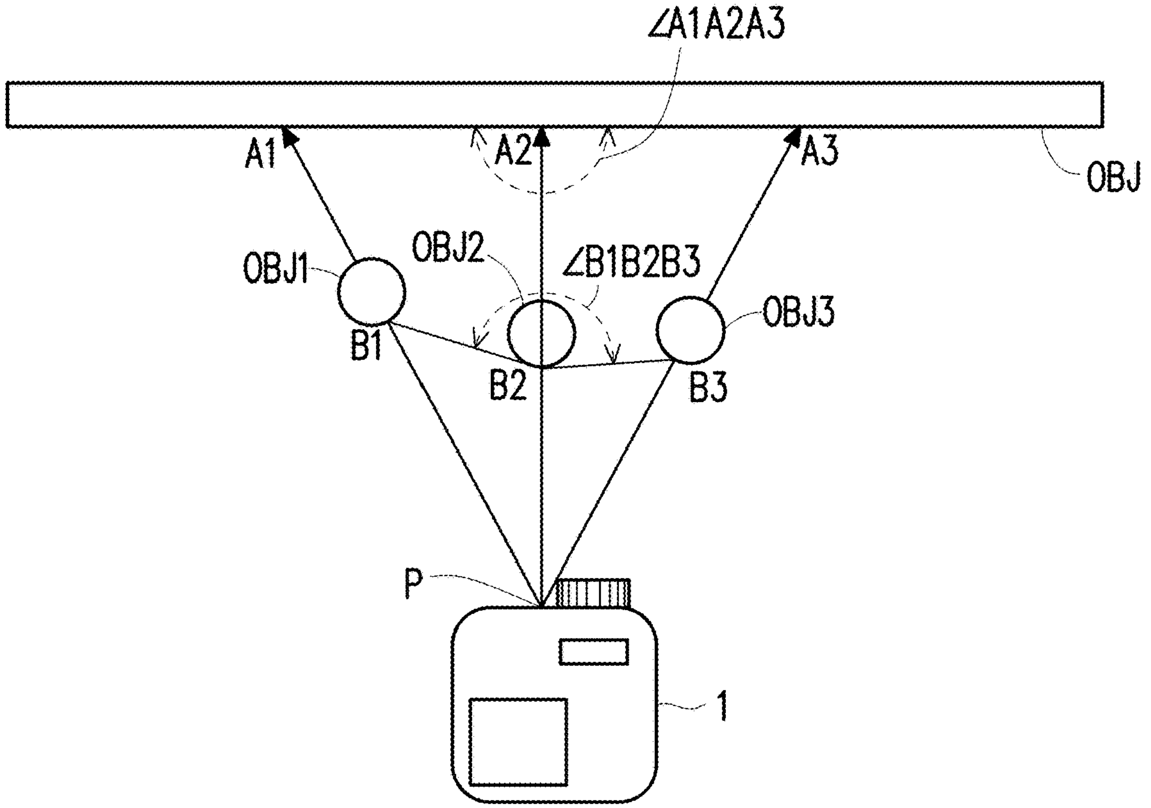

In the embodiment in FIG. 4H, obstacles OBJ1-OBJ3 are placed between the projection device 1 and the projection screen SCR. The ranging unit 10 of the projection device 1 emits the testing light beams toward the positions corresponding to the first effective sensing points B1 to B3 on the obstacles OBJ1-OBJ3, and the testing light beams partially penetrate the obstacles and emit toward the projection screen SCR, so that the ranging unit 10 receives the reflected light beams of the first effective sensing points A1 to A3 on the projection screen SCR corresponding to the obstacles OBJ1-OBJ3. As a result, the processor 11 determines that the included angle ∠ A1A2A3 is approximately 180° or falls in a range of 180°±5°, but not the included angle ∠ B1B2B3. Therefore, the processor 11 selects the sensing points A1, A2, and A3 as the first selected sensing points, and generates the first projection distance information according to the first selected sensing points.

Figure 4I:
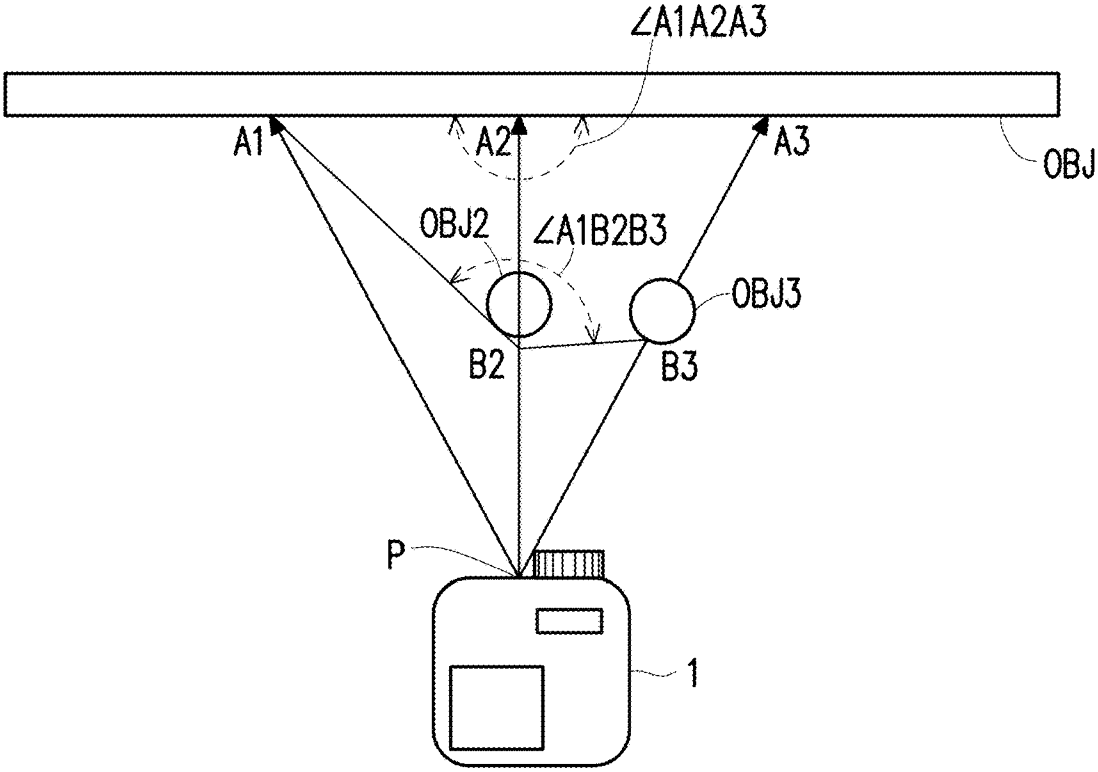

In FIG. 4I, two obstacles OBJ2 and OBJ3 are placed between the projection device 1 and the projection screen SCR. The ranging unit 10 of the projection device 1 emits the testing light beams toward the positions corresponding to the first effective sensing points A1 to A3 on the projection screen SCR. The testing light beams are partially reflected by the obstacles OBJ2 and OBJ3, and the first effective sensing points B2 and B3 are generated. As a result, the processor 11 determines that the included angle ∠ A1A2A3 is approximately 180° or falls in a range of 180°±5°, but not the included angle ∠ A1B2B3. Therefore, the processor 11 selects the sensing points A1, A2, and A3 as the first selected sensing points, and generate the first projection distance information according to the first selected sensing points.

Figure 4J:
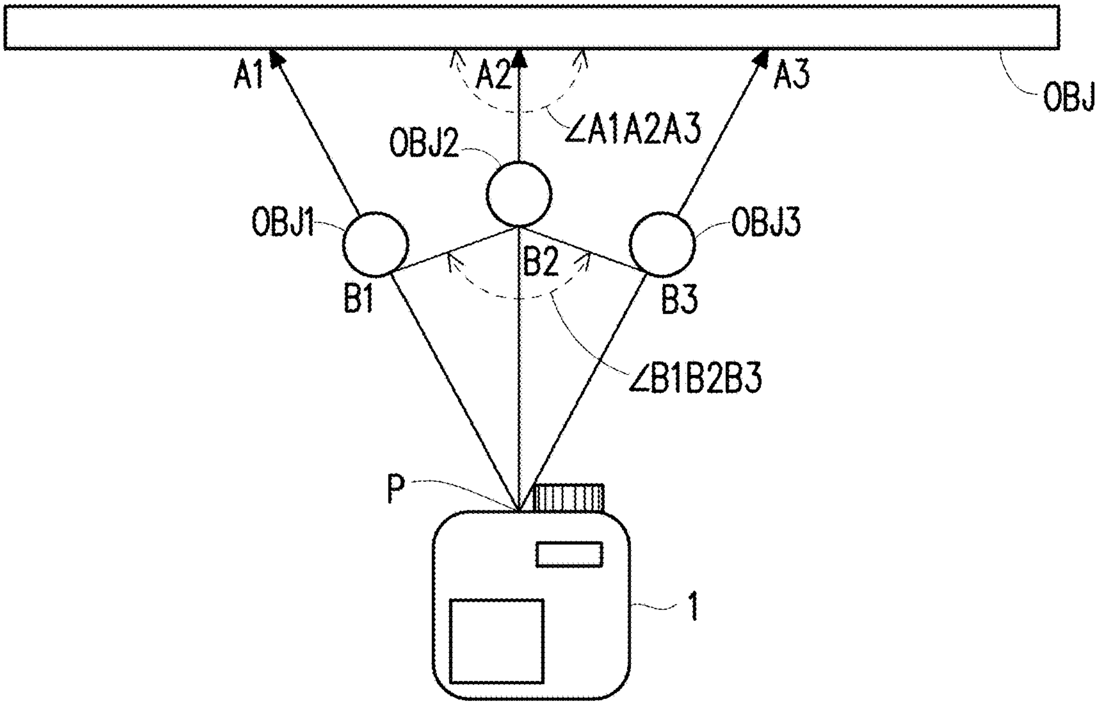

In FIG. 4J, obstacles OBJ1-OBJ3 are placed between the projection device 1 and the projection screen SCR. The ranging unit 10 of the projection device 1 emits the testing light beams toward the positions corresponding to the first effective sensing points B1 to B3 on the obstacles OBJ1-OBJ3, and the testing light beams partially penetrate the obstacles and emit toward the projection screen SCR, such that the ranging unit 10 obtains the first effective sensing points A1-A3 on the projection screen SCR corresponding to the positions of the obstacles OBJ1-OBJ3. In this case, the processor 11 determines that the included angle ∠ A1A2A3 is approximately 180° or falls in a range of 180°±5°, but the included angle ∠ B1B2B3 is not. Therefore, the processor 11 selects the sensing points A1, A2, and A3 as the first selected sensing points, and generates the first projection distance information according to the first selected sensing points.

Figure 4K:
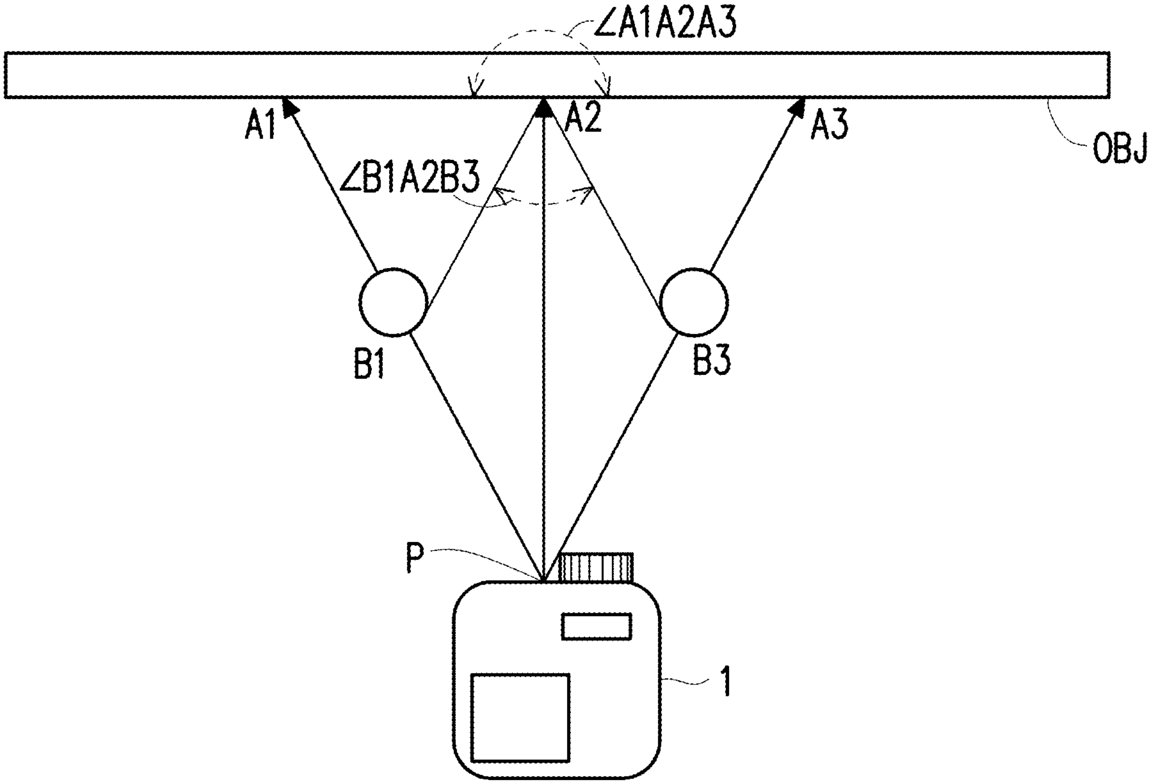

In FIG. 4K, two obstacle OBJ1 and OBJ3 are placed between the projection device 1 and the projection screen SCR. The ranging unit 10 of the projection device 1 emits the testing light beams toward the projection screen SCR at the positions corresponding to the obstacles OBJ1 and OBJ3 on. The testing light beams are partially reflected by the obstacles OBJ1 and OBJ3, and the first effective sensing points B1 and B3 are obtained corresponding to the obstacles OBJ1 and OBJ3. In addition, the ranging unit still obtains the reflected light beams from the sensing points A1, A2, and A3 of the projection screen SCR. In this case, the processor 11 determines that the included angle ∠ A1A2A3 is approximately 180° or falls in a range of 180°±5°, but not the included angle/B1A2B3. Therefore, the processor 11 selects the sensing points A1, A2, and A3 as the first selected sensing points, and generates the first projection distance information according to the first selected sensing points.

Certainly, in situations that the obstacles OBJ1-OBJ3 are arranged along the first direction in a straight line and the processor 11 determines that the first effective sensing points B1-B3 are also arranged along the first direction and forming a connecting line, the processor 11 may further perform selection according to whether the energy intensity difference of the first effective reflected light beam falls in the predetermined range. Since the reflected light beams reflected by the obstacles OBJ1-OBJ3 may have larger energy differences, the processor 11 can effectively exclude the first effective sensing points B1-B3 and select the first effective sensing points A1-A3 as the first selected sensing points, and generate the first projection distance information accordingly.

Figure 5A:
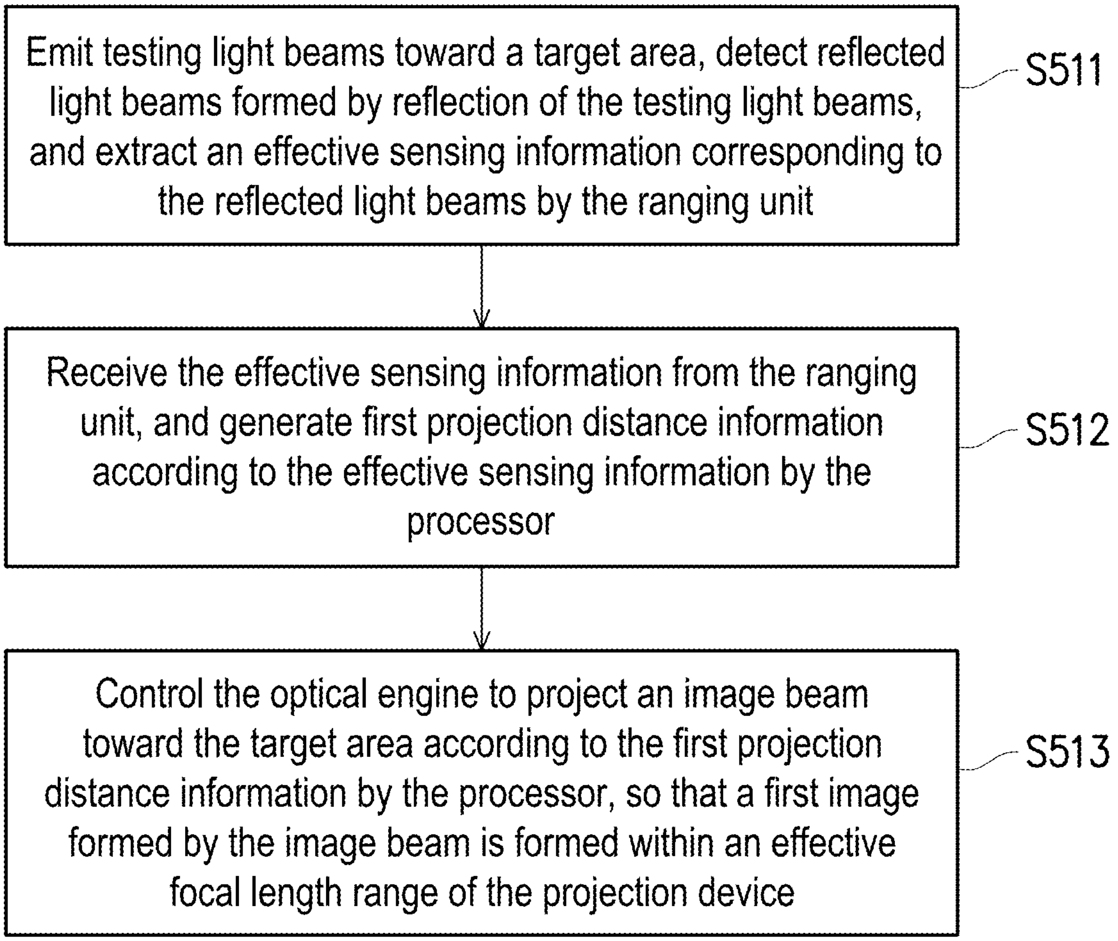
FIG. 5A is a flow chart of a projection method according to an embodiment of the disclosure.

FIG. 5A is a flow chart of a projection method according to an embodiment of the disclosure. The projection method in FIG. 5A may be applied to the projection device 1 in FIG. 1. The projection method in FIG. 5A includes Steps S511 to S513. In Step S511, the ranging unit 10 may emit the testing light beams to the projection screen SCR and detect reflected light beams reflected by the testing light beams to obtain effective sensing information. In Step S512, the processor 11 may receive the effective sensing information from the ranging unit 10 and generate first projection distance information according to the effective sensing information. In Step S513, the processor 11 may control the optical engine12 to project an image beam to the projection screen SCR according to the first projection distance information, so that a first image formed by the image beam is formed within an effective focal length range of the projection device 1. For details related to Steps S511 to S513, reference may be made to the relevant paragraphs above and is therefore omitted herein.

Figure 5B:
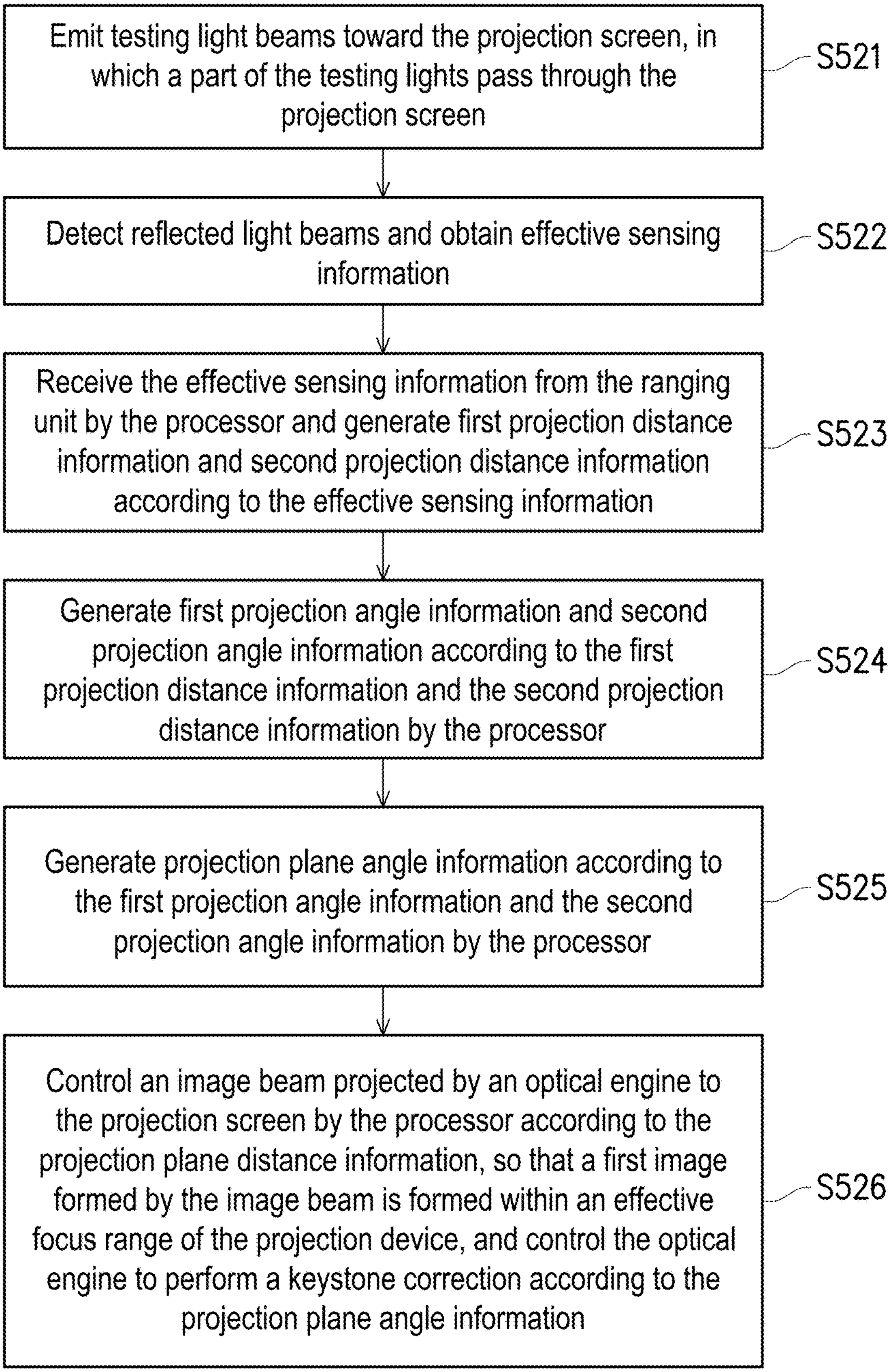
FIG. 5B is a flow chart of a projection method according to an embodiment of the disclosure.

FIG. 5B is a flow chart of a projection method according to an embodiment of the disclosure. The projection method in FIG. 5B may be applied to the projection device 1 in FIG.

1. The projection method in FIG. 5B includes Steps S521 to S526. In Step S521, the ranging unit 10 may emit testing light beams toward the projection screen SCR. In Step S522, the ranging unit 10 may detect reflected light beams and obtain effective sensing information. In Step S523, the processor 11 may receive the effective sensing information provided by the ranging unit 10 and generate first projection distance information and second projection distance information according to the effective sensing information. In Step S524, the processor 11 may generate first projection angle information and second projection angle information according to the first projection distance information and the second projection distance information. In Step S525, the processor 11 may generate projection plane distance information according to the first projection distance information and the second projection distance information, and further generate projection plane angle information according to the first projection angle information and the second projection angle information. In Step S526, the processor 11 may control the optical engine12 to project an image beam to the projection screen SCR according to the projection information, so that a first image formed by the image beam can be formed within an effective focal length range of the projection device, and control the optical engine 12 to perform a keystone correction according to the projection plane angle information. For details related to Steps S521 to S526, reference may be made to the relevant paragraphs above, and is therefore omitted herein.

In summary, the projection device and the projection method according to the embodiments of the disclosure have at least one of the following advantages: the interference caused by the obstacle in front of the projection screen when measuring the distance can be effectively eliminated, and the error caused by material factors of the projection screen is eliminated so that the optical engine can correctly adjust the focal length range to the position of the projection screen.

As used herein, the terms "substantially," "substantial," "approximately," and "about" are used to denote and account for small variations. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As another example, a thickness of a film or a layer being "substantially uniform" can refer to a standard deviation of less than or equal to ±10% of an average thickness of the film or the layer, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. The term "substantially coplanar" can refer to two surfaces within 50 μm of lying along a same plane, such as within 40 within 30 within 20 within 10 or within 1 μm of lying along the same plane. Two components can be deemed to be "substantially aligned" if, for example, the two components overlap or are within 200 within 150 within 100 within 50 within 40 within 30 within 20 within 10 or within 1 μm of overlapping. Two surfaces or components can be deemed to be "substantially perpendicular" if an angle therebetween is, for example, 90°±10°, such as ±5°, ±4, ±3°, ±2°, ±1°, ±0.5°, ±0.1°, or ±0.05°. When used in conjunction with an event or circumstance, the terms "substantially," "substantial," "approximately," and "about" can refer to instances in which the event or circumstance occurs precisely, as well as instances in which the event or circumstance occurs to a close approximation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device suitable for projecting to a target area, wherein the projection device comprises an optical engine, a ranging unit, and a processor, wherein:

the optical engine is configured to project an image beam for forming a first image;

the ranging unit is configured to emit a plurality of testing light beams toward the target area, detect reflected light beams formed by reflection of the testing light beams, and extract an effective sensing information corresponding to the reflected light beams, wherein the ranging unit is configured to select a plurality of first effective reflected light beams from the reflected light beams according to a set condition, and obtain a plurality of first effective sensing points corresponding to the plurality of first effective reflected light beams, wherein the effective sensing information comprises the plurality of first effective reflected light beams and the plurality of first effective sensing points, and the plurality of first effective sensing points are sensing points on the target area and respectively correspond to the plurality of first effective reflected light beams; and the processor is coupled to the ranging unit and the optical engine, the processor is configured to receive the effective sensing information from the ranging unit, generate first projection distance information according to the effective sensing information, and control the optical engine to project the image beam to the target area according to the first projection distance information, so that the first image is formed within an effective focal length range of the projection device.

2. The projection device as claimed in claim 1, wherein the processor selects at least three first selected sensing points from the plurality of first effective sensing points, and generates the first projection distance information according to the at least three first selected sensing points; wherein the at least three first selected sensing points are arranged along a first direction and located on one plane.

3. The projection device as claimed in claim 1, wherein the set condition is that an energy intensity of the reflected light beam is greater than a threshold value, and the reflected light beam is selected as the first effective reflected light beam, if the reflected light beam satisfies the set condition.

4. The projection device as claimed in claim 2, wherein in response to the processor determining that there are the plurality of first effective sensing points arranged along the first direction respectively and located on multiple planes, the processor selects the at least three first effective sensing points from the first effective reflected light points located on the same plane and corresponding to the first effective reflected light beams having energy intensity differences within a predetermined range as the at least three first selected sensing points, and the processor generates the first projection distance information according to the at least three first selected sensing points.

5. The projection device as claimed in claim 2, wherein in response to the processor determining that there are the plurality of first effective sensing points arranged along the first direction respectively and located on multiple planes, the processor selects the at least three first effective sensing points that are closest to the projection device as the at least three first selected sensing points, and generates the first projection distance information according to the at least three first selected sensing points.

6. The projection device as claimed in claim 2, wherein the ranging unit further selects a plurality of second effective reflected light beams from the reflected light beams according to the set condition, and obtains a plurality of second effective sensing points corresponding to the plurality of second effective reflected light beams; the effective sensing information comprises the plurality of second effective reflected light beams and the plurality of second effective sensing points, the processor selects at least three second selected sensing points from the plurality of second effective sensing points and generates the second projection distance information according to the at least three second selected sensing points, wherein the at least three second selected sensing points are arranged along a second direction and are located on the same plane with the at least three first selected sensing points.

7. The projection device as claimed in claim 6, wherein the first direction is perpendicular to the second direction.

8. The projection device as claimed in claim 6, wherein the ranging unit further selects a plurality of third effective reflected light beams from the reflected light beams according to the set condition to obtain a plurality of third effective sensing points located at corners of the target area.

9. The projection device as claimed in claim 6, wherein the processor further generates a first projection angle information according to the at least three first selected sensing points, generates a second projection angle information according to the at least three second selected sensing points, and generates a projection plane angle information according to the first projection angle information and the second projection angle information.

10. The projection device as claimed in claim 9, wherein the processor performs a keystone correction according to the projection plane angle information, the first projection distance information, and the second projection distance information, and controls the optical engine to perform projection according to the keystone correction.

11. The projection device as claimed in claim 1, wherein at least two effective reflected light beams among the plurality of first effective reflected light beams are generated by reflection of one testing light beam among the plurality of the testing light beams.

12. A projection method suitable for controlling operations of a projection device, wherein the projection device comprises an optical engine, a ranging unit, and a processor; the projection method comprises:

emitting testing light beams toward a target area, detecting reflected light beams formed by reflection of the testing light beams, and extracting an effective sensing information corresponding to the reflected light beams by the ranging unit, wherein a plurality of first effective reflected light beams are selected from the reflected light beams according to a set condition, and a plurality of first effective sensing points corresponding to the plurality of first effective reflected light beams are obtained by the ranging unit, wherein the effective sensing information comprises the plurality of first effective reflected light beams and the plurality of first effective sensing points, and the plurality of first effective sensing points are sensing points on the target area and respectively correspond to the plurality of first effective reflected light beams;

receiving the effective sensing information from the ranging unit, and generating first projection distance information according to the effective sensing information by the processor; and controlling the optical engine to project an image beam toward the target area according to the first projection distance information by the processor, so that a first image formed by the image beam is formed within an effective focal length range of the projection device.

13. The projection method as claimed in claim 12, comprising:

selecting at least three first selected sensing points from the plurality of first effective sensing points, and generating the first projection distance information according to the at least three first selected sensing points by the processor, wherein the at least three first selected sensing points are arranged along a first direction and located on one plane.

14. The projection method as claimed in claim 13, wherein the set condition is that an energy intensity of the reflected light beam is greater than a threshold value, and the reflected light beam is selected as the first effective reflected light beam if the reflected light beam satisfies the set condition.

15. A projection method suitable for controlling operations of a projection device, wherein the projection device comprises an optical engine, a ranging unit, and a processor; the projection method comprises:

emitting testing light beams toward a target area, detecting reflected light beams formed by reflection of the testing light beams, and extracting an effective sensing information corresponding to the reflected light beams by the ranging unit;

selecting a plurality of first effective reflected light beams from the reflected light beams according to a set condition, and obtaining a plurality of first effective sensing points corresponding to the first effective reflected light beams by the ranging unit, wherein the effective sensing information comprises the plurality of first effective reflected light beams and the plurality of first effective sensing points;

receiving the effective sensing information from the ranging unit, and generating first projection distance information according to the effective sensing information by the processor;

selecting at least three first selected sensing points from the plurality of first effective sensing points, and generating the first projection distance information according to the at least three first selected sensing points by the processor, wherein the at least three first selected sensing points are arranged along a first direction and located on one plane;

in response to the processor determining that there are the plurality of first effective sensing points arranged along the first direction respectively and located on multiple planes, selecting the at least three first effective sensing points from the plurality of first effective reflected light points located on the same plane and corresponding to first effective reflected light beams having energy intensity differences within a predetermined range, and generating the first projection distance information according to the at least three first selected sensing points by the processor; and controlling the optical engine to project an image beam toward the target area according to the first projection distance information by the processor, so that a first image formed by the image beam is formed within an effective focal length range of the projection device.

16. A projection method suitable for controlling operations of a projection device, wherein the projection device comprises an optical engine, a ranging unit, and a processor; the projection method comprises:

emitting testing light beams toward a target area, detecting reflected light beams formed by reflection of the testing light beams, and extracting an effective sensing information corresponding to the reflected light beams by the ranging unit;

selecting a plurality of first effective reflected light beams from the reflected light beams according to a set condition, and obtaining a plurality of first effective sensing points corresponding to the first effective reflected light beams by the ranging unit, wherein the effective sensing information comprises the plurality of first effective reflected light beams and the plurality of first effective sensing points;

receiving the effective sensing information from the ranging unit, and generating first projection distance information according to the effective sensing information by the processor;

selecting at least three first selected sensing points from the plurality of first effective sensing points, and generating the first projection distance information according to the at least three first selected sensing points by the processor, wherein the at least three first selected sensing points are arranged along a first direction and located on one plane;

in response to the processor determining that there are the plurality of first effective sensing points arranged along the first direction respectively and located on multiple planes, selecting the at least three first selected sensing points that are closest to the projection device, and generating the first projection distance information according to the at least three first selected sensing points by the processor; and controlling the optical engine to project an image beam toward the target area according to the first projection distance information by the processor, so that a first image formed by the image beam is formed within an effective focal length range of the projection device.

17. A projection method suitable for controlling operations of a projection device, wherein the projection device comprises an optical engine, a ranging unit, and a processor; the projection method comprises:

emitting testing light beams toward a target area, detecting reflected light beams formed by reflection of the testing light beams, and extracting an effective sensing information corresponding to the reflected light beams by the ranging unit;

selecting a plurality of first effective reflected light beams from the reflected light beams according to a set condition, and obtaining a plurality of first effective sensing points corresponding to the first effective reflected light beams by the ranging unit, wherein the effective sensing information comprises the plurality of first effective reflected light beams and the plurality of first effective sensing points;

receiving the effective sensing information from the ranging unit, and generating first projection distance information according to the effective sensing information by the processor;

selecting at least three first selected sensing points from the plurality of first effective sensing points, and generating the first projection distance information according to the at least three first selected sensing points by the processor, wherein the at least three first selected sensing points are arranged along a first direction and located on one plane;

selecting a plurality of second effective reflected light beams from the reflected light beams according to the set condition, and obtaining a plurality of second effective sensing points corresponding to the plurality of second effective reflected light beams by the ranging unit; the effective sensing information comprises the plurality of second effective reflected light beams and the plurality of second effective sensing points;

selecting at least three second selected sensing points from the second effective sensing points, and generating the second projection distance information according to the at least three second selected sensing points by the processor, wherein the at least three second selected sensing points are arranged along a second direction and are located on the same plane with the at least three first selected sensing points; and controlling the optical engine to project an image beam toward the target area according to the first projection distance information by the processor, so that a first image formed by the image beam is formed within an effective focal length range of the projection device.

18. The projection method as claimed in claim 17, wherein the first direction is perpendicular to the second direction.

19. The projection method as claimed in claim 17, further comprising:

selecting a plurality of third effective reflected light beams from the reflected light beams according to the set condition by the ranging unit, and obtaining a plurality of third effective sensing points located at corners of the target area.

20. The projection method as claimed in claim 17, further comprising:

generating a first projection angle information according to the at least three first selected sensing points, and generating a second projection angle information according to the at least three second selected sensing points by the processor; and generating a projection plane angle information according to the first projection angle information and the second projection angle information by the processor.

21. The projection method as claimed in claim 20, comprising:

performing a keystone correction according to the projection plane angle information, the first projection distance information, and the second projection distance information by the processor, so as to control the optical engine to perform projection according to the keystone correction.

22. The projection method as claimed in claim 12, wherein at least two first effective reflected light beams among the plurality of first effective reflected light beams are generated by reflection of one testing light beam among the plurality of the testing light beams.

* * * * *